United States Patent [19]

Belser et al.

[11] Patent Number: 4,912,585
[45] Date of Patent: Mar. 27, 1990

[54] DISCRETE TRACK THIN FILM MAGNETIC RECORDING DISK WITH EMBEDDED SERVO INFORMATION

[75] Inventors: Karl A. Belser, Los Gatos; Tarek Makansi, Pleasanton; Ian L. Sanders, Morgan Hill, all of Calif.

[73] Assignee: International Business Machines Corporation, Armonk, N.Y.

[21] Appl. No.: 187,157

[22] Filed: Apr. 28, 1988

[51] Int. Cl.⁴ .............................................. G11B 5/82
[52] U.S. Cl. .................................. 360/135; 360/131
[58] Field of Search ..................... 360/135, 77, 131

[56] References Cited

U.S. PATENT DOCUMENTS

| | | | |
|---|---|---|---|
| Re. 32,075 | 1/1986 | Harrison et al. | 360/77 |
| 2,797,402 | 6/1957 | Duffey et al. | 360/51 |
| 3,185,972 | 5/1965 | Sippel | 360/109 |
| 3,593,331 | 7/1971 | Connell et al. | 360/135 |
| 3,864,754 | 2/1975 | Miklos et al. | 360/131 |
| 4,297,734 | 10/1981 | Laishley et al. | 360/78 |
| 4,351,010 | 9/1982 | Arai | 360/131 |
| 4,488,189 | 12/1984 | Axmear et al. | 360/78 |
| 4,511,938 | 4/1985 | Betts | 360/77 |
| 4,642,709 | 2/1987 | Vinal | 360/77 |
| 4,746,580 | 5/1988 | Bishop et al. | 428/557 |
| 4,802,050 | 1/1989 | Miyabayashi et al. | 360/135 |
| 4,805,065 | 2/1989 | Jagannathan et al. | 360/135 |

FOREIGN PATENT DOCUMENTS

| | | | |
|---|---|---|---|
| 2343017 | 3/1974 | Fed. Rep. of Germany | 360/135 |
| 55-139667 | 10/1980 | Japan | 360/135 |
| 56-148734 | 11/1981 | Japan | 360/135 |
| 58-212624 | 12/1983 | Japan | 360/135 |
| 59-33626 | 2/1984 | Japan | |
| 1443248 | 7/1976 | United Kingdom | |

OTHER PUBLICATIONS

A. J. Betts, "Null servo Pattern", IBM Technical Disclosure Bulletin, vol. 18, No. 8, Jan., 1976, pp. 2656-2657.

W. A. Harrington, et al., "Quad-Burst PES System for Disk File Servo", IBM Technical Disclosure Bulletin, vol. 21, No. 2, Jul. 1978, pp. 804-805.

K. Y. Ahn, et al., "Selective Modification of Magnetic Properties Via Ion Implantation", IBM Technical Disclosure Bulletin, vol. 21, No. 4, Sep. 1978, pp. 1706-1707.

C. C. Liu, "Quad-Burst Servo Pattern", IBM Technical Disclosure Bulletin, vol. 22, No. 12, May 1980, pp. 5436-5438.

E. G. Gruss, et al., "Servo System for Magnetic Recording Based on Time Comparison", IBM Technical Disclosure Bulletin, vol. 23, No. 2, Jul. 1980, pp. 787-789.

Primary Examiner—John H. Wolff
Attorney, Agent, or Firm—Thomas R. Berthold

[57] ABSTRACT

A discrete track thin film metal alloy or metal oxide magnetic recording disk has a plurality of angularly spaced sectors, each sector being formed of a plurality of discrete blocks of magnetic material which are magnetically polarized in the disk's circumferential direction. These discrete servo blocks and the discrete magnetic tracks are both formed at the same time during the fabrication of the thin film disk such that each servo block is precisely and permanently radially aligned with an associated discrete data track. Following the fabrication of the disk, each of the servo blocks is exposed to the magnetic field generated by passing a direct current (DC) through a recording head. In this manner each of the servo blocks becomes magnetized in the circumferential direction and thereby presents two discrete magnetic transitions to a servo read head or a read/write head.

5 Claims, 1 Drawing Sheet

TRACK 20    TRACK 22    TRACK 24    NORMAL PES

TRACK 20 + 1/2 TR.    TRACK 22 + 1/2 TR.    TRACK 24 + 1/2 TR.    QUADRATURE PES

DISCRETE TRACK THIN FILM MAGNETIC RECORDING DISK WITH EMBEDDED SERVO INFORMATION

TECHNICAL FIELD

This invention relates to magnetic recording disks of the type which include head positioning servo information embedded in sectors angularly spaced around the disk. In particular, the invention is a discrete track thin film disk with discrete magnetized servo blocks located within sectors on the disk, each of the servo blocks being precisely and permanently aligned with an associated discrete data track.

BACKGROUND OF THE INVENTION

In certain magnetic recording disk files which have a relatively high density of data tracks, it is necessary to provide servo control of the position of the read/write heads to both maintain the heads over the tracks in the presence of various disturbances and to position the heads quickly and accurately to other tracks for subsequent read and write operations. In order to accomplish this, certain disk files utilize prerecorded servo signals on either a dedicated servo disk or on the data disks to provide a head position error signal (PES) to the head position control system. One method of incorporating this servo information is to record the information on a separate dedicated disk and use a servo read head on that disk to imply the location of read/write heads on the same actuator on other data disks within a given tolerance limit. In this method, the control system receives a continuous PES which permits very accurate positioning of the servo head, but the read/write heads suffer track misalignment due to thermal and mechanical effects, such as disk flutter.

In order to provide improved track registration of the heads, another method of incorporating the servo information is to embed prerecorded servo signals on the data disks in equally angularly spaced sectors which extend out radially from the data disk centers. As such a disk rotates, the read/write head, or a dedicated servo read head, receives sampled position signals as the servo sectors pass beneath the head. Because in this method the sectors of servo information are recorded on the disk between sectors of data, it is desirable to minimize the number and angular extent of these servo sectors in order to maximize the amount of disk surface area available for data. Various methods of head positioning using sector servo are described in assignee's U.S. Pat. Nos. 3,185,972; 4,297,734; 4,488,189; and 4,511,938. While there are numerous types of servo patterns which may be used with sector servo, two specific types are the "null" and "quad-burst" patterns described in the IBM Technical Disclosure Bulletin (TDB) articles of January 1976 (pp. 2656-2657) and July 1978 (pp. 804-805), respectively.

In commercially available disks, such as those which may be used in disk files using a sector servo method, the magnetic layer formed on the disk substrate is either a continuous thin film of magnetic metal alloy or metal oxide or a continuous film of organic material containing magnetic particles. Thus, during operation of the disk file, data may be recorded at any radial position on the disk where the continuous magnetic film is formed. Because the read/write head cannot always be precisely aligned over any predetermined radial position on the disk, new data recorded over a previously recorded track may be recorded on the disk in a radial position slightly offset from the track where the previous data was recorded. This may occur even though the previous data and the new data are identified as having been recorded on the same data track. When the read/write head reads the signal from this track it will also pick up previously recorded signals on the disk at the edges of the track. An additional problem with the use of a continuous magnetic film is that because the magnetic media extends radially on the disk on both sides of the read/write head, fringe magnetic fields from the read/write head during recording will generate magnetic patterns at the edges of the tracks. In the case of thin film metal alloy or metal oxide disks, this creates disorientation of the magnetic domains in the film at the track edges which results in noise when the recorded signal is read back.

In order to overcome the above shortcomings of disks with continuous magnetic films, disks with discrete magnetic tracks separated by discrete nonmagnetic guard bands or separator tracks have been proposed. One such disk and its fabrication process are described in assignee's concurrently-filed copending application, Ser. No. 07/187,110, filed Apr. 28, 1988, entitled "Thin Film Magnetic Recording Disk and Fabrication Process". While discrete track disks have been proposed, no such disks are commercially available. In addition, no successful servo technique has been proposed which takes full advantage of all the benefits which discrete track disks offer.

SUMMARY OF THE INVENTION

The invention is a discrete track thin film metal alloy or metal oxide magnetic recording disk with a plurality of angularly spaced sectors, each sector being formed of a plurality of discrete blocks of magnetic material which are magnetically polarized in the disk's circumferential direction. These discrete servo blocks and the discrete magnetic tracks are both formed at the same time during the fabrication of the thin film disk such that each servo block is precisely and permanently radially aligned with an associated discrete data track. Following the fabrication of the disk, each of the servo blocks is exposed to the magnetic field generated by passing a direct current (DC) through a recording head. In this manner each of the servo blocks becomes magnetized in the circumferential direction and thereby presents two discrete magnetic transitions to a servo read head or a read/write head.

The invention avoids problems which would be associated with a discrete track disk if such a disk were to use servo sectors formed on continuous magnetic media. Because in the present invention the servo pattern in each sector is inherently formed at the time the discrete track disk is fabricated, there is no need to write a specific servo pattern in the servo sectors. More importantly, because the "writing" of the servo information is merely the DC magnetizing of each servo block, this magnetization can be done in the disk file by either the read/write head or a dedicated servo recording head. Since a DC recording technique is used to magnetize the discrete servo blocks, which are permanently aligned with their respective data tracks, there is no need for a special servo writer and its associated external position sensor to align the servo recording head with the data tracks. In addition, the absence of continuous media in the servo sectors permits the angular extent of the sectors to be narrower. This is because the servo signal comprises a discrete number of pulses which occur at the transitions between servo blocks of magnetic material and the absence of magnetic material, thereby eliminating the need for averaging a high frequency servo signal to eliminate media defects, as would be required if the servo signal were recorded in the conventional manner on continuous media. Because the servo blocks are isolated from one another in the radial direction, the radial width of the servo pattern is precisely defined by the servo blocks, rather than by the width of a conventional servo recording head. In continuous media, the fringing fields created by the servo recording head during servo writing is a factor which limits the minimum radial width of a servo track.

For a fuller understanding of the nature and advantages of the present invention reference should be made to the following detailed description taken in conjunction with the accompanying drawings.

DESCRIPTION OF THE PREFERRED EMBODIMENTS

Figure 1:
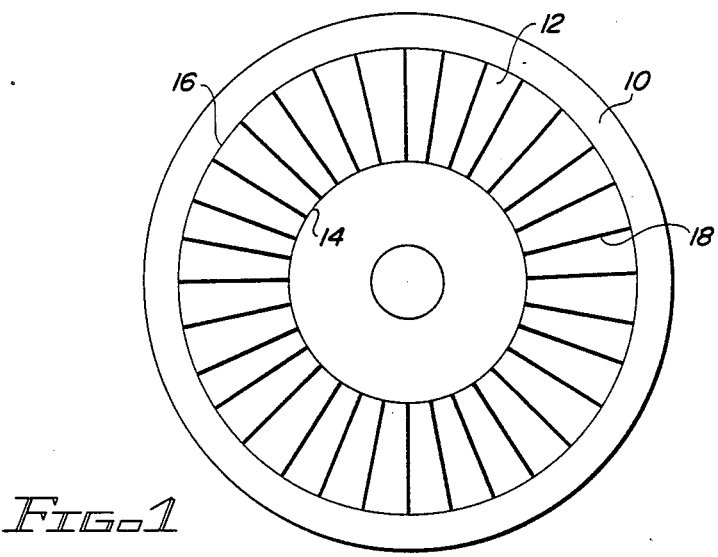
FIG. 1 is a representation of a disk illustrating a data band interspersed with 32 equally angularly spaced servo sectors.

Referring first to FIG. 1, a thin film metal alloy magnetic recording disk 10 has an annular data region or band 12 which is defined by an inside diameter (ID) 14 and an outside diameter (OD) 16. Interspersed about the data band are 32 equally angularly spaced servo sectors, represented as radial lines, such as typical servo sector 18.

During operation of the disk file, the head reads or writes data on a selected one of a number of concentric data tracks located between the ID 14 and OD 16 of the data band 12. In order to accurately read or write data from a selected track, the head is required to be maintained over the centerline of the track. Accordingly, each time one of the servo sectors, such as typical sector 18, passes beneath the head, the head positioning control system receives servo information from the servo blocks contained within the servo sector. The information contained in the servo blocks generates a PES which is used by the head positioning control system to move the head towards the track centerline. Thus, during a complete rotation of the disk 10, the head is continually maintained over the track centerline by servo information from the servo blocks in successive servo sectors.

Figure 2:
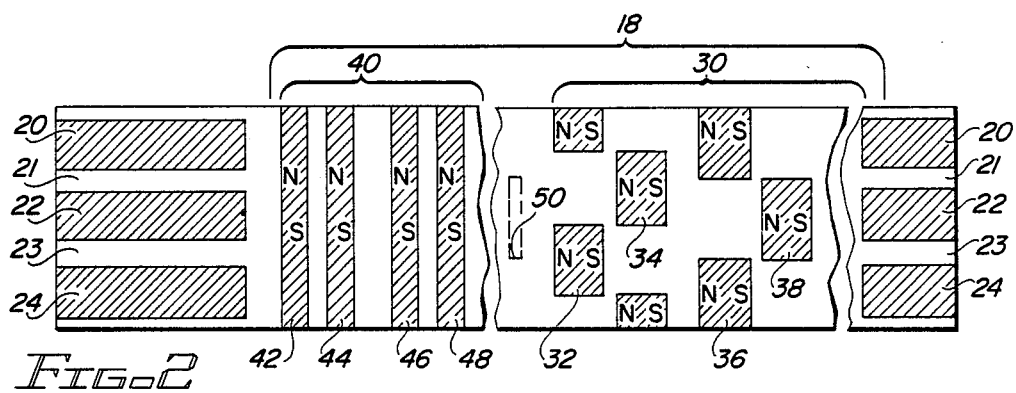
FIG. 2 is a representation of a portion of the disk of FIG. 1 illustrating three data tracks and one servo sector which includes circumferentially magnetized servo blocks formed in a null-type pattern to provide normal and quadrature position error signals.

An expanded view of typical servo sector 18 and portions of three data tracks are illustrated in FIG. 2. The three discrete data tracks 20, 22, 24 contain magnetizable material, such as a cobalt-based magnetic alloy, and are separated from one another by discrete guard bands or tracks 21, 23. All of the shaded portions of FIG. 2, including the discrete data tracks 20, 22, 24, represent magnetizable material formed on the disk 10. All other portions on the disk 10 are of a nonmagnetizable material.

The disk as just described is identical to the disk made according to the process described in applicants' copending application, Ser. No. 187,110, (which is incorporated herein by reference) with the exception that it contains the sector servo patterns, such as typical pattern 18. Accordingly, the preferred process for making the disk structure used in this invention is identical to the process of the '110 application, with the exception that the mask used to form the patterned photoresist is patterned to include the servo sectors, such as the additional pattern included in servo sector 18 shown in FIG. 2.

Referring again to FIG. 2, a portion of the servo sector 18 is a servo field 30 which includes discrete, spaced-apart servo blocks, such as typical servo blocks 32, 34 and 36, 38. Also included in servo sector 18 is a field 40 of radial stripes 42, 44, 46, 48 which are used to provide synchronization and gain control for the subsequently read servo signals from servo blocks 32, 34 and 36, 38. Additional information, e.g., timing marks indicating the beginning of a servo sector and/or a coded pattern for identifying the specific servo track by track number, may also be included in servo sector 18. As shown in FIG. 2, each of the servo blocks 32, 34 and 36, 38 is precisely and permanently aligned with the centerline of associated data tracks 20, 22, 24. In contrast, if the servo sector contained magnetic transitions written in the conventional manner on continuous magnetic media interspersed between the discrete data tracks 20, 22, 24, the magnetic transitions would be arbitrarily aligned, depending upon the radial position of the servo recording head relative to the discrete data tracks.

The servo blocks 32, 34 and 36, 38 in servo field 30 and the radial stripes 42-48 in the synchronization/gain field 40 are DC magnetized in the circumferential direction, as indicated by the designations "N" and "S" in FIG. 2. Thus, instead of a large number of magnetic transitions between the ends of a servo block, as would be the case in continuous magnetic media, only two such transitions occur in a servo block. These are the transitions at the beginning and end of a servo block since those ends are located at the transitions between areas of magnetizable and nonmagnetizable material on the disk. For each passage of a servo block beneath the head 50 (represented by dashed lines in FIG. 2), two discrete pulses will be generated.

The servo blocks and synchronization/gain stripes are formed by a recording head having direct current (DC) applied to it. This is accomplished by either a specific servo recording head or the data read/write head in the disk file which exposes the entire disk surface to the DC magnetizing field as the head is moved radially. Alternatively, the disk may be magnetized by a DC magnetic field prior to incorporation into the disk file.

Figure 3A:
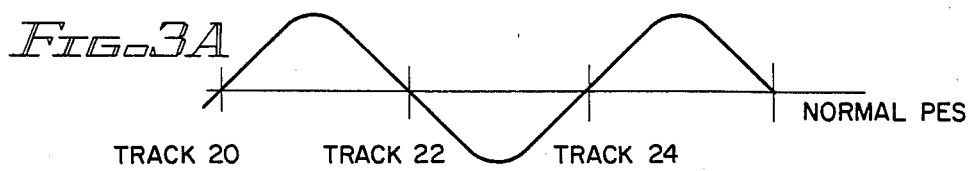
FIG. 3A is a function of the sum of signal amplitudes created by the normal servo blocks passing beneath the head as a function of radial position of the head.
Figure 3B:
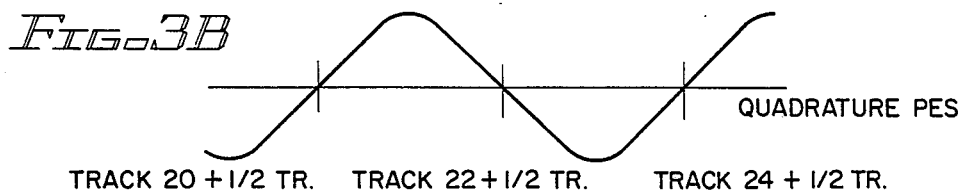
FIG. 3B is a function of the sum of signal amplitudes created by the quadrature servo blocks passing beneath the head as a function of radial position of the head.

In the specific null-type quadrature servo implementation shown in FIG. 2, servo blocks 32, 34 are "normal" blocks which provide a normal PES, and servo blocks 36, 38 are "quadrature" blocks which provide a quadrature PES. The normal blocks are precisely radially aligned relative to the data tracks such that the edges of radially adjacent normal servo blocks are radially aligned with the centerlines of the data tracks. For example, servo blocks 32, 34 have their radially adjacent edges aligned with the centerline of track 22. The quadrature blocks are in turn precisely radially aligned with the data tracks such that the edges of radially adjacent quadrature blocks are radially aligned with the centerlines of the guard tracks. For example, quadrature blocks 36, 38 have their radially adjacent edges aligned with the centerline of guard track 23. The DC magnetized servo blocks provide a linear position signal which is always available from either the normal or quadrature PES. In the technique for utilizing the signals from the servo blocks to provide a PES, which is well known in the art and does not form a part of the present invention, the amplitudes of the signals from servo blocks on either side of the track centerline are compared, with the PES being generated by the difference in amplitudes of signals from the appropriate blocks. For example, if the head 50 is exactly positioned on the centerline of track 22 (FIG. 2), the normal blocks 32, 34 will generate pulses of equal amplitude. If the head 50 is located slightly off center from the centerline of track 22, then the relative amplitudes of the pulses from the blocks 32, 34 will provide a normal PES whose magnitude and direction is related to radial position, as shown by FIG. 3A. Similarly, FIG. 3B represents the relative amplitude of signals from the quadrature blocks as a function of radial position of the head.

In one specific embodiment of the present invention, data tracks of 4.0 micron radial width separated by 3.0 micron radially wide nonmagnetic separator tracks were lithographically formed on a substrate. A sector servo pattern of 12 discrete servo blocks, each having a circumferential length of 1.5 micron and together having an angular extent of approximately 0.1 degrees, was formed between the data tracks. With the use of an inductive thin film head, the servo blocks provided readily distinguishable signal pulses, ranging in amplitude from 100 microvolts to 14 microvolts peak-to-peak, at a frequency corresponding to a disk rotational speed of approximately 3000 RPM.

While the preferred embodiments of the present invention have been illustrated in detail, it should be apparent that modifications and adaptations to those embodiments may occur to one skilled in the art without departing from the scope of the present invention as set forth in the following claims. For example, while the present invention has been described with the use of multiple equally angularly spaced servo sectors, the invention is applicable to those types of disk files which use a single sector or "wedge" servo on the data disk.

What is claimed is:

1. A magnetic recording disk comprising:
   a disk substrate;
   a plurality of concentric generally circular discrete data tracks of magnetic material located on the substrate, each of the discrete data tracks being separated from a radially neighboring data track by a concentric guard track of nonmagnetic material; and
   a plurality of discrete servo blocks of magnetic material magnetically polarized in the circumferential direction and located on the substrate in at least one angular sector of the disk, each of the servo blocks being separated from neighboring servo blocks and data tracks by regions of nonmagnetic material and having at least one generally circumferentially directed edge located on the substrate at a fixed predetermined radial distance from the centerline of the data track radially nearest said edge.

2. The disk according to claim 1 wherein the servo blocks are located in a plurality of sectors generally equally angularly spaced around the disk, whereby the generally circular data tracks are divided into a plurality of circular arcs.

3. The disk according to claim 1 wherein the servo blocks in each sector form a pattern which repeats in a radial direction.

4. The disk according to claim 1 further comprising synchronization and gain stripes of circumferentially magnetically polarized magnetic material located in the sector.

5. The disk according to claim 4 wherein the pattern is a quadrature pattern.

* * * * *